United States Patent [19]

Russo

[11] 3,762,553
[45] Oct. 2, 1973

[54] INDIRECTOR CHLORINATOR

[75] Inventor: Ronald D. Russo, Wethersfield, Conn.

[73] Assignee: Koehler-Dayton Inc., New Britian, Conn.

[22] Filed: May 5, 1971

[21] Appl. No.: 140,574

Related U.S. Application Data

[63] Continuation-in-part of Ser. No. 2,101, Jan. 12, 1970, abandoned.

[52] U.S. Cl. .............................. 210/152, 210/208
[51] Int. Cl. ......................... C02c 5/06, C02b 1/18
[58] Field of Search ........................... 210/59–62, 152, 196, 198, 205–208

[56] References Cited
UNITED STATES PATENTS

| | | | |
|---|---|---|---|
| 3,451,552 | 6/1969 | Carlson | 210/152 |
| 3,563,384 | 2/1971 | DeLahey et al. | 210/152 |
| 3,446,356 | 5/1969 | May | 210/152 X |
| 3,463,726 | 8/1969 | Schulte | 210/60 X |
| 3,472,390 | 10/1969 | Pall et al. | 210/62 |
| 3,515,278 | 6/1970 | Wilson | 210/152 X |

Primary Examiner—Samih N. Zaharna
Assistant Examiner—Thomas G. Wise
Attorney—Joseph R. Spalla

[57] ABSTRACT

A sewage treatment system particularly adapted for use in small boats, in which an additive for treating the sewage is stored in dry form, such as in tablets, in a tank separate from, but in communication with, the sewage treatment chamber. Flushing a toilet associated with the system automatically activates a water pump and causes water to be pumped from a separate source into the additive tank, dissolve a portion of the additive and flow, such as by gravity, from the tank into the treating chamber. At the same time a combination macerating and mixing unit is energized to reduce solid sewage to at least a maximum particulate size and vigorously mix and remacerate the reduced sewage with the dissolved additive flowing from the tank into the chamber.

6 Claims, 2 Drawing Figures

PATENTED OCT 2 1973 3,762,553

INVENTOR
RONALD D. RUSSO
BY
Marechal, Biebel, French & Bugg
ATTORNEYS

INDIRECTOR CHLORINATOR

CROSS REFERENCE TO RELATED APPLICATION

This application is a Continuation-in-Part of application Ser. No. 2,101, filed by applicant on Jan. 12, 1970, for Indirect Chlorinator, now abandoned.

BACKGROUND OF THE INVENTION

In order to obviate the pollution problems which occur when raw sewage is dumped directly overboard from boats, it is desirable to reduce the solid sewage to an acceptable particulate size and mix the liquid and reduced solid sewage with a treating agent to lower the bacteria count of the sewage to an acceptable level. The treating agent, which may conveniently be a chlorine based additive, is highly corrosive and difficult to handle in liquid form. To this end, the patent to Carlson, U.S. Pat. No. 3,451,552, issued on June 24, 1967, and the patent to DeLaney et al., U.S. Pat. No. 3,563,384, issued on Feb. 16, 1971, disclose a sewage treatment system for small pleasure boats and the like in which the treating agent is charged into the system in a tablet form and the raw sewage, after having been reduced to an acceptable size, is flowed through a bed of the tablets, thereby dissolving a portion of the tablets and releasing chlorine to the system. The raw sewage, now partially mixed with dissolved chlorine, is directed from the bed of tablets around a series of baffles to insure a thorough mixing and is then directed through a discharge port in the treatment chamber.

While a system using a bed of tablets through which the raw sewage is pumped does avoid the handling problems associated with highly corrosive sewage treating additives and does serve to reduce the bacteria count of the sewage to an acceptable level before it is discharged overboard, the bed of tablets is susceptible to clogging by the solid portion of the sewage, even though this portion is reduced to a relatively small particulate size. It should also be noted that the installation of baffles in the sewage treating chamber results in additional manufacturing time and expense.

Whenever chlorine of high concentration is brought into contact with organic matter, such as solid human waste or paper products, a chemical reaction occurs. This results in the formation of a foam or froth inside the chamber. The reaction is also exothermic which causes undesirable quantities of heat to be generated.

In units such as that disclosed in U.S. Pat. No. 3,451,552, the foam collects in the tablet bed and holding areas after a few cycles of operation and forms a more solid slime or sludge, which restricts the free flow of water therethrough. As the flow of water is reduced, the heat generated by the chemical reaction is not completely dissipated. Additionally, the slime or sludge may cause a quantity of water to be trapped in the tablet bed between flushings so that the solid tablets become soggy and rapidly consumed on subsequent flushings.

SUMMARY OF THE INVENTION

A sewage treatment system according to the present invention while utilizing a sewage treating additive in a dry, rather than liquid form, maintains the dry additive separate from the raw sewage. When a toilet associated with the sewage system is flushed, a pump is actuated and pumps a relatively uncontaminated solvent, such as the water in which the boat is floating, into the additive tank, dissolving a portion of the additive and then passing into the sewage treatment chamber. At the same time, a combined macerating and mixing unit is activated, reducing solid materials in the sewage to an acceptable particulate size and then vigorously mixing and remacerating the liquid and reduced solid sewage with the dissolved chemical additive flowing into the chamber.

In this manner the necessity of using a liquid additive is avoided as well as the problem of clogging associated with a system in which the raw sewage is pumped through a bed of additive in tablet form.

Additionally, by utilizing a vigorous mixer or remacerator in conjunction with the reducing unit, the sewage and the dissolved additive are intimately mixed without the necessity of inserting baffles in sewage treatment chamber.

Furthermore, the foam which is inherently formed by the combining of concentrated chlorine and organic matter is broken up or dispersed by the vigorous mixing or remaceration; and that foam which does remain in the chamber from a previous usage is washed from the walls of the chamber on the next cycle of operation, thus preventing a buildup of slime and sludge and the concomitant clogging caused thereby.

The above and other features and advantages of the present invention will become better understood from the detailed description of the invention that follows, when considered in connection with the accompanying drawings.

DESCRIPTION OF THE PREFERRED EMBODIMENT

Figure 1:
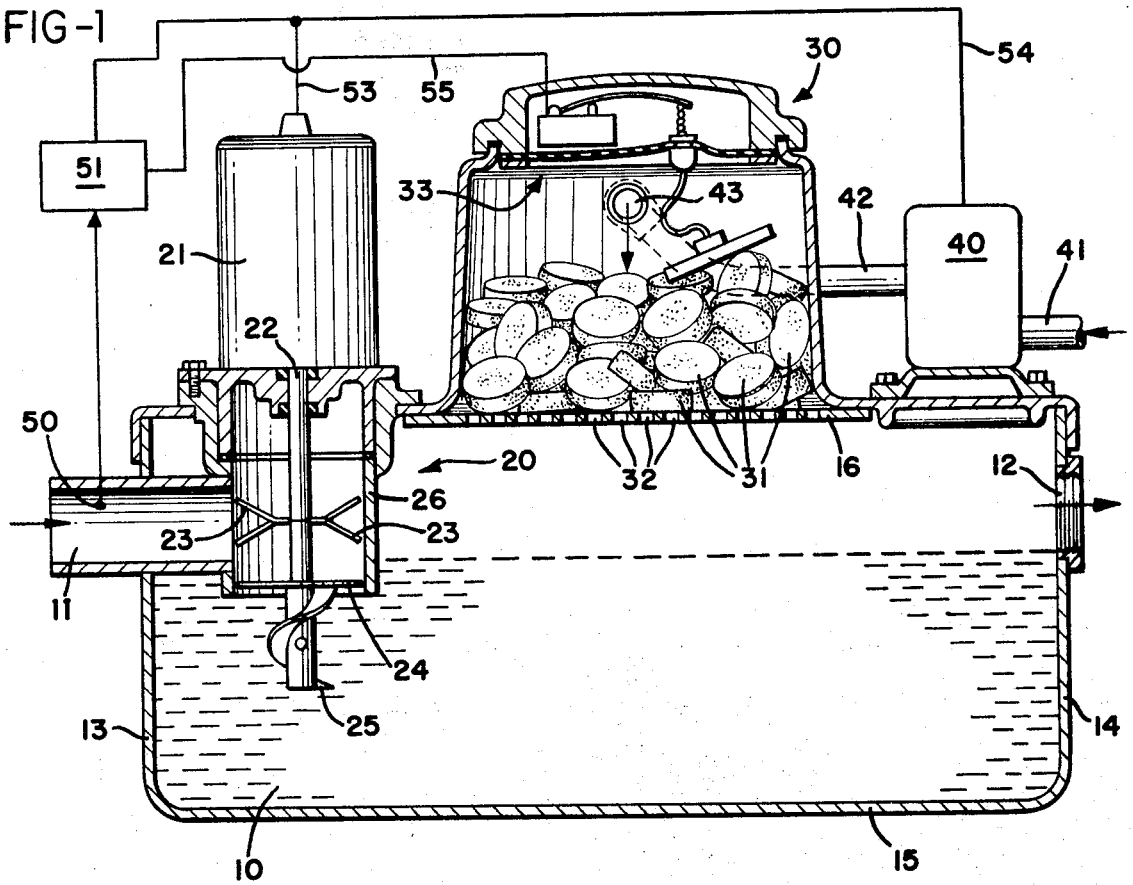
FIG. 1 is an elevational view, partly in cross section, showing a preferred embodiment of the invention.

As seen in FIG. 1 of the drawings, the sewage treatment system comprises a chamber 10 having an inlet port 11 and a discharge port 12 formed in opposite walls 13 and 14 with at least the discharge port 12 spaced from the bottom wall 15 of the chamber.

Positioned in the inlet port 11 is a macerating and mixing device, referenced generally 20, for reducing the particle size and for vigorously agitating the macerated sewage with dissolved additive. The unit 20 comprises a motor 21 which rotates a shaft 22 to which are affixed a plurality of radially extending blades 23, a substantially disk-shaped member 24 and a helical flight 25. The adjacent blades 23 have their distal portions directed alternately upwardly and downwardly and the clearance between the ends of the blades and the substantially cylindrical wall 26 as well as the distance between the periphery of the disk 24 and the wall 26 is maintained relatively small for a purpose to be presently explained.

The helical flight 25, in addition to agitating the contents of the chamber 10, also functions (1) to remacerate the sewage, (2) to break up or disperse the foam formed by the combination of a concentrated additive, such as chlorine, and organic matter, such as solid human waste and paper products, and (3) to flush from the walls 13, 14 and 15 any foam remaining from the previous cycle of operation. As to (1), this fosters the reduction of coliform bacteria, since the chlorine can more readily contact a greater surface area of the waste material. As to (2), the flight 25 unexpectedly reduces or breaks up the foam, rather than increasing it, as would normally result from agitation. Therefore, more of the foam is dissipated and washed out through the discharge port 12 and less slime and sludge is produced in the chamber 10. As to (3), if the agitation by the flight 25 is sufficiently intense, the walls of the chamber 10 are actually cleansed of any foam from previous cycles. Therefore, there is little or no buildup of slime or sludge inside the chamber and the clogging caused thereby is avoided.

Mounted on the top wall 16 of the chamber 10 is an additive tank 30 containing a supply of sewage treating additive which may be in tablet form, as shown at 31. The top wall 16 also serves as a bottom wall for the tank 30, and has a series of slots 32 formed therein.

While not forming per se a part of the present invention, the tank 30 may also be provided with a sensing mechanism 33 which senses when the level of additive in the tank 30 falls below a predetermined amount and prevents actuation of the unit 21 upon this occurrence.

Also mounted on the chamber 10 is a pump 40 having an inlet conduit 41, which may be conveniently directed overboard and thereby provide a source of relatively uncontaminated water to the pump 40, and an outlet conduit 42 leading into the tank 30 through the inlet opening 43.

A pressure sensing device of any suitable design, shown schematically in the drawing at 50, is positioned in the inlet port 11 and is capable of generating a signal to the energizing unit 51 on the sensing of a predetermined pressure in the port 11. The energizing unit 51 is of the type which incorporates a timing mechanism so that upon generation of a signal to unit 51 the unit will be activated for a preset period of time. The unit 20 and the pump 40 are connected to the unit 51 by means of lines 53 and 54, respectively, while line 55 connects the safety device 33 with the unit 51.

In operation, a charge of raw sewage from a toilet associated with the sewage treatment system is delivered by any convenient means through the inlet port 11 of the chamber 10. This may be accomplished by an automatic or manual flush system. One conventional form of manually operated pump is one in which the pump handle is actuated a number of strokes to draw in water from overboard and force the raw sewage under pressure into the treatment system. If this type of pump is used, the timing mechanism in unit 51, which may cause the unit to be activated, for example, for a ten second interval upon actuation, allows unit 51 to be continuously activated as the pump handle is moved up and down, rather than activated on the pressurizing stroke and deactivated on the return stroke.

Regardless of the manner in which the sewage is delivered to the chamber, however, the pressure generated is sensed by the pressure sensitive device 50 which generates a signal to control unit 51. Unit 51 then energizes the macerating and mixing unit 20 causing the shaft 22 to rotate about its axis and subject any solid sewage which passes through the inlet port to a reducing action by the blades 23. Due to the relatively small clearance between the outer periphery of the disk 24 and the inner surface of the substantially cylindrical member 26, solid sewage is retained in the member 26 until such time as the sewage is reduced to a small enough size to pass between the space between the disk 24 and the wall 26.

Simultaneously with the energization of the unit 20, the control unit 51 energizes the pump 40 causing a supply of relatively uncontaminated water to be drawn from any convenient source, such as overboard, through the conduits 41 and 42 and the inlet opening 43 to the interior of the additive tank 30. The solvent passing through the tank 30 causes a portion of the dry additive to be dissolved and pass in liquid form through the openings 32 into the chamber 10. The helical flight 25 agitates the contents of the chamber and achieves an intermixing of the dissolved additive and the liquid and reduced solid sewage. Additionally, the flight 25 remacerates the sewage, breaks up the foam formed in the chamber 10, and flushes the walls of the chamber 10. As noted above, the timing mechanism incorporated in unit 51 allows the unit 51, and hence the motor 21 and pump 40, to operate continuously during pumping of sewage into the chamber rather than intermittently. As the liquid level of the combined additive and sewage rises above the lowermost portion of the outlet port 12, the now-treated sewage is discharged overboard.

In the system described the unit 20 and pump 40 will ordinarily be simultaneously deactivated a preset time interval after the pressure in inlet conduit 11 drops below a predetermined value. Alternatively, a separate timer can be associated with the pump 40 so that additional disinfectant is delivered to chamber 10 after unit 21 is deactivated.

Figure 2:
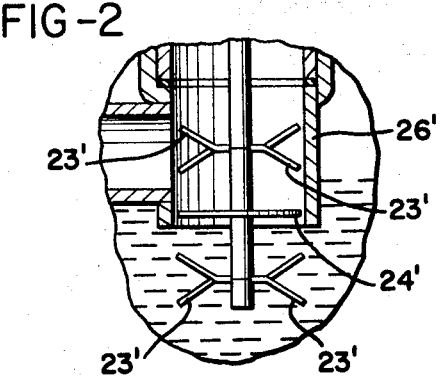
FIG. 2 is an elevational view showing a modification of the invention.

While in the embodiment of FIG. 1 a helical flight 25 is utilized to macerate and mix the sewage and dissolved additive, it will be noted that a double bladed macerating and mixing unit may be used as shown in FIG. 2. Thus, as seen in FIG. 2, the unit 20' is equipped with radially extending blades 23' mounted above and blades 23'' mounted below the disk 24' surrounded by the cylindrical wall 26'. In this manner the lower blades 23'' not only mix the sewage and additive but also function to further reduce sewage particles both before and after the additive and sewage are mixed. As with the helical blade 25, the blades 23'' also break up the foam formed in the chamber 10, and flush from the walls of the chamber 10 any residue foam from a previous cycle of operation.

The effectiveness of the instant invention is graphically demonstrated in Table I. These tests were conducted under applicant's personal supervision at the plant of the assignee of this application. As shown therein the chlorinator of U.S. Pat. No. 3,451,552 became clogged after a small number of usages. This unit did not always clog after only eight uses, but the unit at least showed substantial amounts of sludge and slime buildup. This unit uses much more chlorine, and, therefore, also discharges more chlorine into the surrounding water.

The chlorinator of the instant invention without the remacerator 25 or 23'' showed improved results over the above device, but still had a substantial problem with foam buildup and the concomitant clogging. The improvement undoubtedly was due to passing relatively clean water through the tablet bed in the additive tank 30, rather than passing raw sewage therethrough, as done in the past. A marked improvement in the consumption of chlorine tablets also results from the use of a metered amount of relatively clean water. This chlorinator design prevents the raw sewage and water from remaining in contact with the tablets between uses, and thereby prevents the tablets from disintegrating as before.

The chlorinator of the instant design utilizing a macerator blade 23'' completely eliminated the foaming and clogging problems encountered with the other designs. The low level of tablet consumption was maintained, and at the same time the coliform bacteria in the effluent were reduced to zero. These were improvements in kind and not degree.

From the above it will be apparent that the present invention obviates the necessity of utilizing difficult to handle liquid sewage treatment additives and at the same time has eliminated the problem of clogging associated with systems in which the raw sewage is circulated through a bed of additive in tablet form or the like. Additionally, the need for baffling is eliminated, with the helical flight 25 and blades 23'' serving to intimately intermix the sewage and additive. At the same time, the sewage treatment system of the present invention is highly effective in reducing the bacteria count of the sewage and in actual tests the coliform bacteria count in raw sewage has been reduced by the waste treatment system of the present invention to zero.

It is to be understood that the instant invention is not limited to the particular type or shape of blade used in chamber 10. For example, in place of the flute 25 and the blades 23'' other macerator-mixers could be used, such as tongs, fingers, or a flat disc with tabs extending therefrom. Other shapes could also be used.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

said conduit means including
  first rotatable impeller means for macerating the effluent and means for restricting the discharge of the macerated effluent therefrom so that only particles having a size smaller than a predetermined maximum size may be discharged therefrom,
  a tank containing sewage treatment tablets,
  second conduit means for delivering a liquid substantially free of particulate material to said tank whereby a portion of the sewage treatment tablets will be dissolved in the liquid,
  means for discharging the liquid including the dissolved portion of the sewage treatment tablets into said sewage treat-ment chamber wherein the dissolved portion of the sewage treat-ment tablets will treat the sewage contaminants contained therein,
  second rotatable impeller means located within said sewerage treatment chamber for remacerating the effluent, and
  means mounting said first and second rotatable impeller means on a common shaft for conjoint rotation.

2. A system for treating sewerage according to claim 1, wherein said second impeller means comprises a helical flight selectively configured for directing the contained effluent to flush the sides of said treatment chamber.

3. A system for treating sewerage according to claim 1, wherein said second impeller means comprises a plurality of blades extending radially outwardly from a rotatable shaft.

4. A system for treating sewage according to claim 1 further including motor means for concurrently energizing said first and second impeller means.

5. A system for treating sewage according to claim 1 further comprising third conduit means for discharging the treated effluent from said sewage treatment chamber wherein the inlet port of said third conduit means

TABLE I

| | Chlorinator of type shown in U.S. patent 3,451,552 | Chlorinator of instant invention without remacerator 25 (Fig.1) or 23'' (Fig. 2) | Chlorinator of instant invention with remacerator as shown in Fig. 2 |
|---|---|---|---|
| Date of testing | Started 6-9-68, test lasted less than 1 week due to unit clogging with foam. | Started 11-25-68, test lasted approximately 1 week due to unit showing foam buildup. | Started 12-9-68, test unit on test for over 3 months continuously. |
| Number of usages | Approximately 8 solid deposits before unit clogged. | Approximately 20 solid deposits before unit showed serious signs of clogging. | Over 80 solid deposits and unit showed no sign of foam clogging. |
| Chlorine tablets used per flush. | Approximately 40 tablets (5 gms. each) were used during a solid deposit flush since tablets came in direct contact with macerated waste. | Approximately 6 tablets were used during a solid deposit flush (clean water was directed over the tablets). | Approximately 6 tablets were used during a solid deposit flush (clean water was directed over the tablets). |
| Buildup of foam and sludge. | Substantial sludge buildup occurred in tablet bed, after only 8 flushes. Foam accumulated in holding area to clog discharge of device. | Foam began to build up in chamber 10 after approximately the 6th flush and continued until the device began to show excessive accumulation. Although it did not plug the discharge completely, the foam buildup seriously inhibited proper smooth flow through the device. | After continued use by 4 people for an 8 hour work day in the laboratory, the device was just as clean as the 1st day. The remacerator broke up the foam and sludge and kept the unit clean. |
| Coliform bacteria reduction. | After 8 solid deposits, the device showed less than 240 coliform bacteria per 100 milliliters of effluent. | After 20 solid deposits, the device showed less than 240 coliform bacteria per 100 milliliters of effluent. | After 80 solid deposits, the device showed zero (0) coliform bacteria in the effluent. |
| Chemical oxygen demand (C.O.D.) reduction. | C.O.D. was reduced to approximately two thirds (⅔) of the original untreated effluent. | C.O.D. was reduced to approximately two thirds (⅔) of the original untreated effluent. | C.O.D. was reduced to approximately two thirds (⅔) of the original untreated effluent. |
| Chlorine content of effluent. | Residual chlorine was very high however, due to excessive dissolving of chlorine tablets (exceeded 2% chlorine at times). | Residual chlorine was reduced significantly due to using much less chlorine. | Residual chlorine was reduced significantly due to the unit using less chlorine. |

I claim:

1. A system for treating sewage comprising
  a sewerage treatment chamber free from baffles and the like whereby sewage may travel directly from the inlet to the outlet thereof,
  conduit means for discharging an effluent containing solid sewage contaminants into said sewage treatment chamber, is spaced from the bottom of said sewage treatment chamber.

6. A sewage treatment system as recited in claim 1, wherein: said tank is positioned above said sewage treatment chamber; and the bottom wall of said tank has openings therein communicating with the said sewage treatment chamber.

* * * * *